United States Patent [19]
Ades

[11] Patent Number: 5,306,065
[45] Date of Patent: Apr. 26, 1994

[54] SUPPLEMENTAL VISOR ASSEMBLY

[76] Inventor: Bruce A. Ades, 763 Plaza Hermosa, Novato, Calif. 94947

[21] Appl. No.: 33,266

[22] Filed: Mar. 16, 1993

[51] Int. Cl.[5] .............................................. B60J 3/02
[52] U.S. Cl. ................................... 296/97.6; 296/97.8
[58] Field of Search ............................... 296/97.6-97.8

[56] References Cited

U.S. PATENT DOCUMENTS

| | | | |
|---|---|---|---|
| 4,792,176 | 12/1988 | Karford | 296/97.8 |
| 4,824,161 | 4/1989 | Lee | 296/97.8 |
| 4,913,483 | 4/1990 | Jasso | 296/97.6 |
| 4,950,021 | 8/1990 | Vandagriff | 296/97.6 |
| 4,982,992 | 1/1991 | Vu et al. | 296/97.6 |
| 5,015,027 | 5/1991 | Rifaat | 296/97.8 |
| 5,156,434 | 10/1992 | Vandagriff | 296/97.8 |
| 5,213,389 | 5/1993 | Loftis et al. | 296/97.7 |

*Primary Examiner*—Robert R. Song
*Attorney, Agent, or Firm*—John R. Flanagan

[57] ABSTRACT

A supplemental visor assembly includes first and second main panel and first and second extension panels. The first main panel is mountable against an existing sun visor panel by a pair of clips attached to the first main panel and releasably attachable to the existing sun visor panel. The first extension panel is mounted against the first main panel by a first pair of spaced strap members to undergo laterally slideable movement relative to the first main panel. The second main panel is hingedly mounted to one end edge of the first main panel to undergo pivotal movement between a stored position against the first main panel and first extension panel and a deployed position away therefrom. The second extension panel is mounted against the second main panel by a second pair of spaced strap members to undergo laterally slideable movement relative to the second main panel.

24 Claims, 2 Drawing Sheets

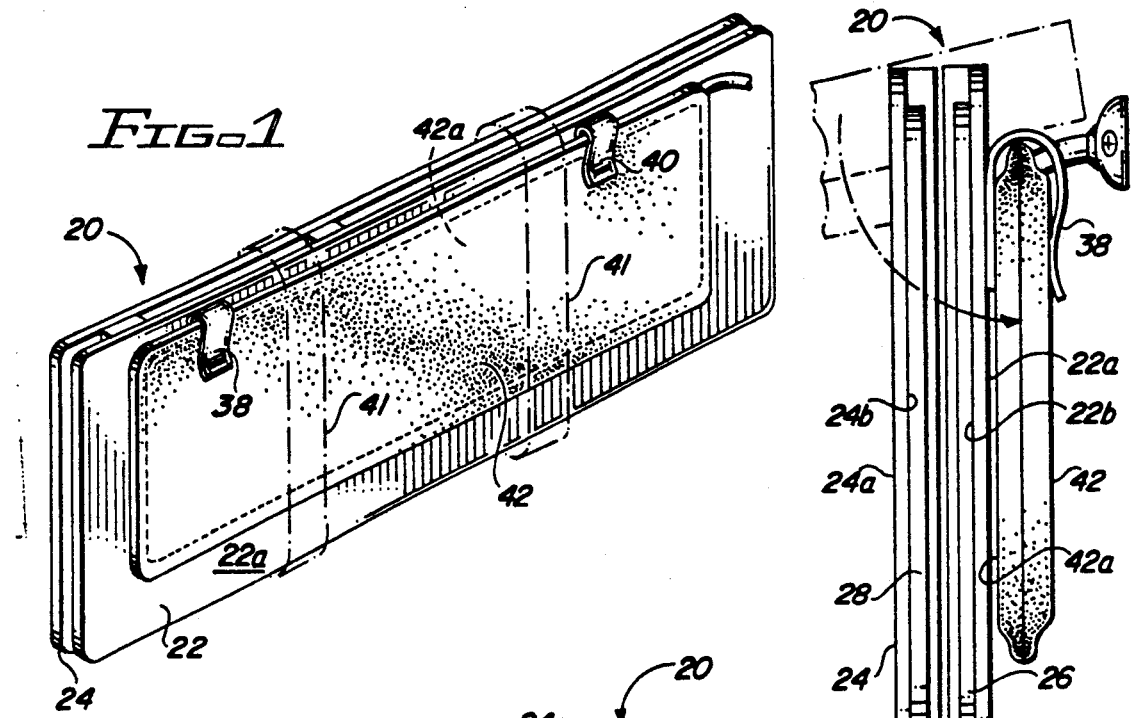
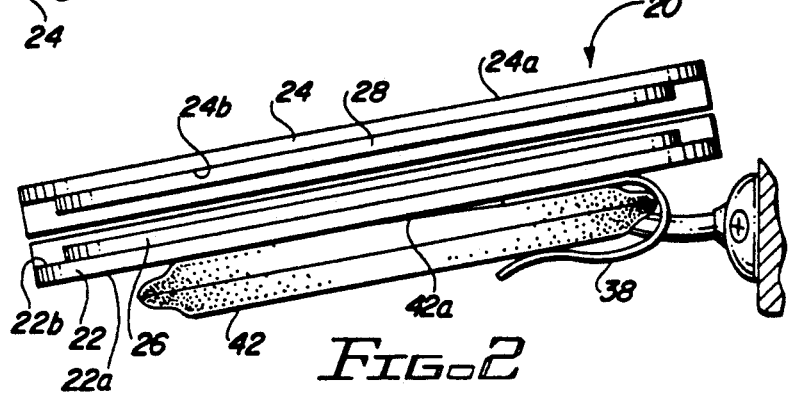
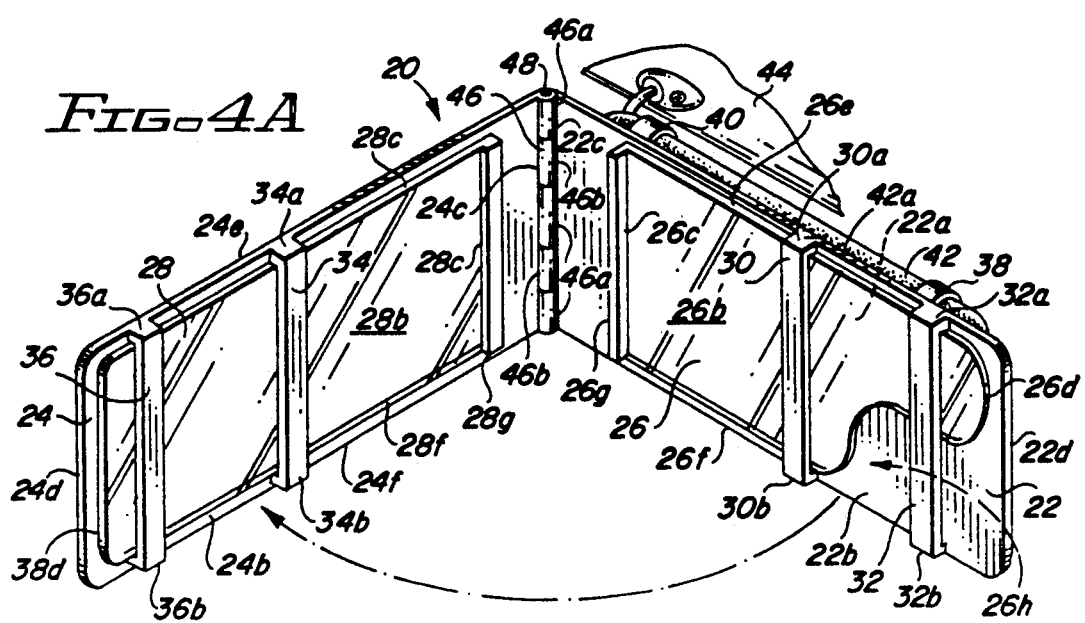

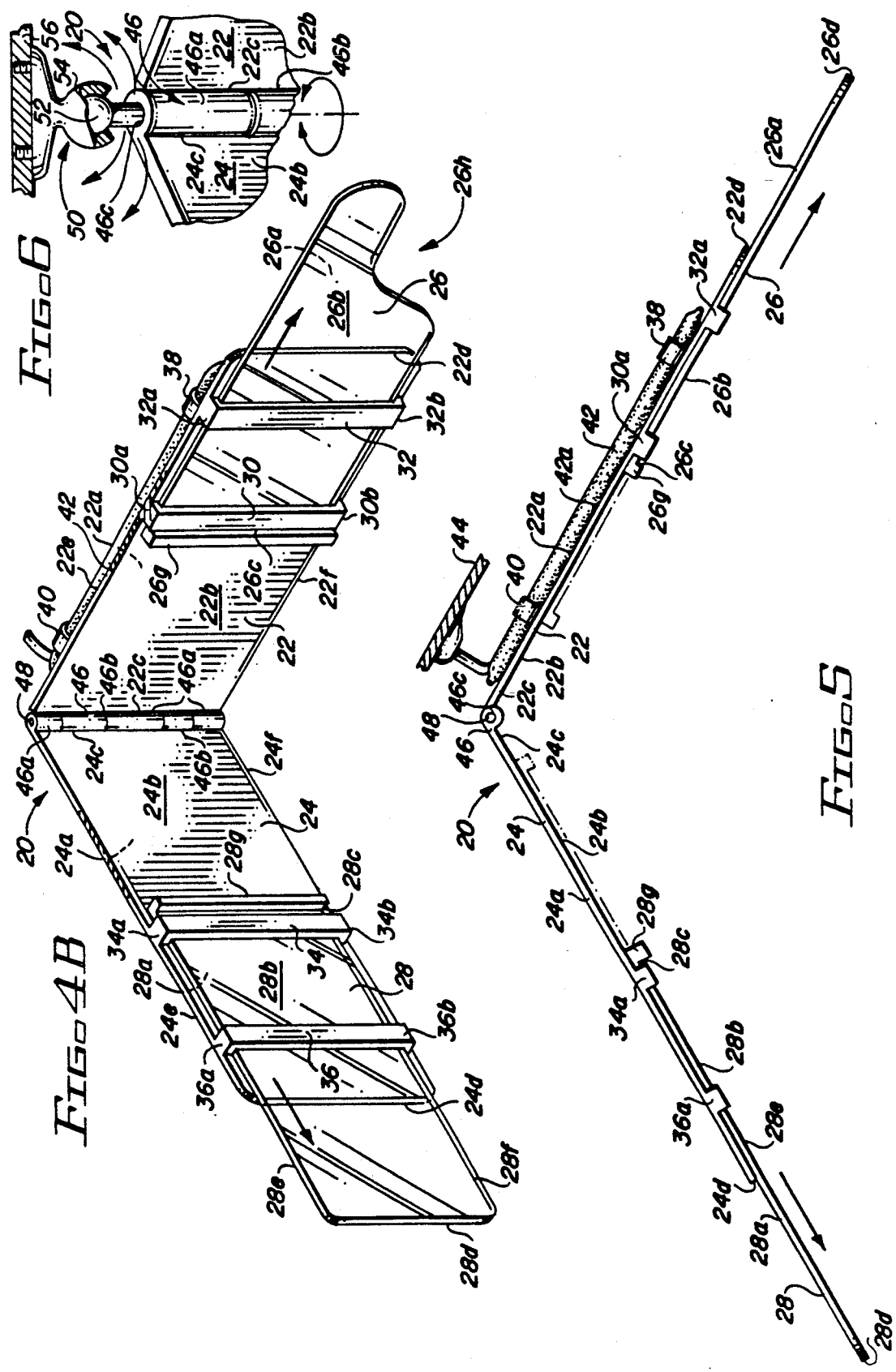

SUPPLEMENTAL VISOR ASSEMBLY

BACKGROUND OF THE INVENTION

1. Field of the Invention

The present invention generally relates to motor vehicle sun visor attachments and, more particularly, is concerned with a supplemental visor assembly.

2. Description of the Prior Art

Effective sun-shading equipment is obviously of utmost importance for optimum driving conditions. To that end sun visors have long been part of standard motor vehicle equipment. Moreover, a variety of sun shading structures have been developed to provide additional protection from sun glare for both drivers and passengers. Some representative examples of these structures are disclosed in U.S. Pat. Nos. to Karford (4,792,176), Jasso (4,913,483), Vu et al (4,982,992) and Vandagriff (4,950,021).

The Karford structure is a visor extension unit with a laterally slidable panel and a downwardly slidable panel contained therein. The unit is attached to an existing sun visor with the individual panels being smaller in size than the existing sun visor. When shading is needed at the side window of the driver or front-seat passenger, the existing sun visor must be pivoted along with the attached visor extension unit to the side window, leaving the front windshield area open to sun glare.

The Jasso structure is an auxiliary sun visor removably attached to an existing sun visor for the sole purpose of shading at a side window of the driver or front-seat passenger. The Vu et al structure is a glare shield, removably clippable to an existing sun visor. The glare shield is basically designed to intercept sun rays when the existing sun visor is not in use.

The Vandagriff structure is an adjustable sun visor unit attachable to an existing sun visor for use either at the front windshield or at a side window of the driver or front-seat passenger. This unit has a divisible, laterally movable, upper panel with an attached supplementary lower panel. The unit has no shading features for both the front windshield and side window simultaneously.

None of the above-described supplemental units provides features for simultaneously shading of the front windshield and a side window of the driver or a front-seat passenger. Additionally, the Karford, Jasso and Vandagriff units are fairly complex in design and construction and thus rather expensive to manufacture. The Vu et al unit is appropriate for use generally only when protection from mild sun glare is needed.

Consequently, a need exists for a supplementary sun shading unit which provides for simultaneous shading of both the front windshield and a side window for a driver or front-seat passenger. The unit should be simple in design and construction for inexpensive manufacture and for ease in use by a driver or passenger in a vehicle.

SUMMARY OF THE INVENTION

The present invention provides a supplemental visor assembly designed to satisfy the aforementioned need by avoiding the drawbacks of the prior art without introducing other drawbacks. Instead, the assembly of the present invention provides expanded capabilities not available in the prior art devices.

One capability is the simplicity in design and construction of the assembly for inexpensive manufacture and for ease in use by either a driver or front-seat passenger in a vehicle.

A second capability is the simultaneous shading coverage provided at both the front windshield and a side window by the supplemental visor assembly.

A third capability is the additional lateral shading coverage provided by the extension panels of the assembly simultaneously (if needed) at both the front windshield and a side window of the vehicle.

Accordingly, the present invention is directed to a supplemental visor assembly which comprises: (a) a first main panel; (b) a first extension panel placeable against the first main panel; (c) first means for mounting the first extension panel on the first main panel to undergo laterally slideable movement relative thereto; (d) a second main panel hingedly mounted to one end of the first main panel to undergo pivotal movement between a stored position against the first main panel and the first extension panel and a deployed position away therefrom; (e) a second extension panel placeable against the second main panel; and (f) second means for mounting the second extension panel on the second main panel to undergo laterally slideable movement relative thereto.

Each of the first and second main panels has a generally rectangular flat configuration. Each of the first and second extension panels is made of a dark opaque material and has a generally rectangular flat configuration and a smaller size than that of the first and second main panels. Each of the first and second extension panels has a tab portion extending along and merging from one of a pair of opposite end edges of each of the first and second extension panels for use in initiating and halting lateral slideable movement of the first and second extension panels. The first and second mounting means includes first and second pairs of spaced mounting members. Each mounting members is a narrow strap extending across a side of the respective one of the first and second main panels. The narrow strap has opposite ends extending outwardly from and merging with the respective main panel. The first and second main panels and the first and second pairs of mounting members preferably are made of material being resistant to ultraviolet light penetration.

Further, the first and second main panels are pivotally connected together by a hinge. The hinge includes a plurality of first and second tubular elements respectively attached on adjacent end edges of first and second main panels. The first tubular elements are offset from the second tubular elements so as to permit interfitting of the first and second tubular elements in a manner which aligns the passages through the tubular elements with one another. The hinge also includes an elongated pin being inserted through the aligned passages of the tubular elements.

The supplemental visor assembly also comprises means for securing the first main panel to an existing sun visor panel. The securing means is a pair of resiliently flexible tension clips spaced from one another and attached to the first main panel. The clips are attachable to the existing sun visor panel to releasably secure the first main panel to the existing sun visor panel.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective rear view of a supplemental visor assembly of the present invention being mounted to an existing prior art sun visor panel.

FIG. 2 is an end elevational view of the sun visor panel and supplemental visor assembly in a raised storage position.

FIG. 3 is an end elevational view of the sun visor panel and supplemental visor assembly deployed in a lowered shading position.

FIG. 4A is a perspective view of the supplemental visor assembly in a retracted and deployed position.

FIG. 4B is a perspective view of the supplemental visor assembly in an extended and deployed position.

FIG. 5 is a top plan view of the supplemental visor assembly in an extended and deployed position.

FIG. 6 is an enlarged fragmentary perspective view of the assembly showing an alternative embodiment of means for releasably securing the supplemental visor assembly to a support structure other than the existing sun visor panel.

DETAILED DESCRIPTION OF THE INVENTION

Referring to the drawings and particularly to FIGS. 1 to 3 and 4A, there is illustrated a supplemental visor assembly of the present invention, being generally designated 20. In its basic components, the assembly 20 includes first and second main panels 22, 24, first and second extension panels 26, 28 and first and second pairs of mounting members 30, 32 and 34, 36. The assembly 20 also comprises means for securing the first main panel 22 to an existing sun visor panel 42 installed in a vehicle 44, as seen in FIGS. 1 and 4A.

More particularly, the securing means is preferably in the form of a pair of resiliently flexible tension clips 38, 40 being hairpin-shaped and made of a suitable flat stock metal, such as spring steel. The clips 38, 40 are spaced from one another and attached on the planar surface 22a of the first main panel 22, as seen in FIGS. 1-3. The clips 38, 40 are releasably securable over the top edge portion of the existing sun visor panel 42 in order to releasably secure the first main panel 22 to the existing sun visor panel 42. As an alternative, the securing means can be a pair of elastic bands 41, as seen in dashed line form in FIG. 1. The elastic bands 41 are spaced from one another and releasably encircle both the first main panel 22 and the existing sun visor panel 42.

The first and second main panels 22, 24 are hingedly joined together, as seen in FIGS. 4A and 4B. The first and second extension panels 26, 28 are mounted flat against the first and second main panels 22, 24 by the first and second pairs of mounting members 30, 32 and 34, 36 to permit laterally slidable movement relative thereto between retracted and extended positions, as also seen in FIGS. 4A and 4B. In the preferred embodiment, the supplemental visor assembly 10 is thereby releasably secured as a complete unit to the existing sun visor panel 42 by the attachment of the tension clips 38, 40, as hereinbefore described and as seen in FIGS. 1-3.

Referring specifically to FIGS. 4A, 4B and 5, the first and second main panels 22, 24 of the assembly 20 are each of generally rectangular configuration, each panel having opposite flat or planar surfaces 22a, 22b and 24a, 24b. Further, the planar surfaces 22a, 22b and 24a, 24b of the respective first and second main panels 22, 24 extend between pairs of opposite vertical and horizontal ends or edges 22c, 22d, 22e, 22f and 24c, 24d, 24e, 24f, respectively. The first and second main panels 22, 24 are of substantially the same size and each exceeds the size of the existing sun visor panel 42, as seen in FIG. 1.

The first and second extension panels 26, 28 are placed flat against the inner planar surfaces 22b, 24b of the first and second main panels 22, 24. The first and second extension panels 26, 28 are mounted thereto by the first and second pairs of mounting members 30, 32 and 34, 36. The first and second extension panels 26, 28 are each of generally rectangular configuration, and each has opposed flat or planar surfaces 26a, 26b and 28a, 28b. Moreover, the flat surfaces 26a, 26b and 28a, 28b of the first and second extension panels 26, 28 extend between pairs of opposite vertical and horizontal ends or edges 26c, 26d, 26e, 26f and 28c, 28d, 28e, 28f, respectively.

Referring to FIGS. 4A and 4B, the first mounting members 30, 32 are in the form of spaced apart, elongated narrow straps 30, 32 extending vertically across the flat surface 26b of the first extension panel 26 and having opposite ends 30a, 30b and 32a, 32b merging and projecting outwardly from the opposite horizontal edges 22e, 22f of the first main panel 22 such that the straps 30, 32 are spaced from the flat surface 22b of the first main panel 22 so as to accommodate insertion of the first extension panel 26 therebetween. Similarly, the second mounting members 34, 36 are in the form of spaced apart, elongated narrow straps 34, 36 extending vertically across the flat surface 28b of the second extension panel 28 and having opposite ends 34a, 34b and 36a, 36b merging from and projecting outwardly from the opposite horizontal edges 24e, 24f of the second main panel 24 such that the straps 34, 36 are spaced from the flat surface 24b of the second main panel 24 so as to accommodate insertion of the second extension panel 28 therebetween. The first and second mounting members 30, 32 and 34, 36 are each formed integrally with the respective first and second main panels 22, 24. Each of these components is made of a suitable material, such as rigid virgin or recycled thermoplastic material, which is highly resistant to ultraviolet light penetration, and is capable of accepting universal pigments or colorants uniformly.

The first and second extension panels 26, 28 also include tab portions 26g, 28g which merge from and extend along the vertical edges 26c, 28c of the first and second extension panels 26, 28. The tab portions 26g, 28g are each formed integrally with the respective first and second extension panels 26, 28. The tab portions 26g, 28g function as both handles and stops. As handles, the tab portions 26g, 28g are gripped to initiate lateral sliding movement of the first and second extension panels 26, 28 relative to the first and second main panels 22, 24 between the retracted positions shown in FIG. 4A and the extended positions shown in FIG. 4B. As stops, the tab portions members 30, 34 so as to halt outer lateral slideable movement of the first and second extension panels 26, 28 relative to the first and second main panels 22, 24.

A lower corner portion 26h is cutout from the first extension panel 26, so as to permit a proper fitting of the first extension panel 26 around a rear view mirror disposed centrally in the front windshield (not shown) when the assembly 20 is in an extended and deployed position, as seen in FIG. 4B. The first and second extension panels 26, 28 are of substantially the same size, being slightly smaller than the first and second main panels 22, 24, as seen in FIG. 4A. The first and second extension panels 26, 28 are preferably made of a dark opaque material, such as plexiglas or Lexan, both to intercept sun glare and to inhibit development of blind spots obstructing the driver's vision.

Referring to FIGS. 4A, 4B and 5, the first and second main panels 22, 24 are pivotally connected together by an elongated hinge 46. The hinge 46 includes a plurality of first and second tubular elements 46a, 46b respectively attached on adjacent vertical edges 22c, 24c of the first and second main panels 22, 24. The first tubular elements 46a are offset from the second tubular elements 46b so as to permit interfitting of the first and second tubular elements 46a, 46b of the hinge 46 in a manner which aligns the passages 46c (FIG. 5) through the tubular elements 46a, 46b with one another. The hinge also includes an elongated pin 48 being inserted by a relatively tight press fit through the aligned passages 46c of the tubular elements 46a, 46b. The tight press fit means that the second main panel 24 will remain at any position to which it is moved relative to the first main panel 22. The hinge 46 and pin 48 are made of any suitable material, such as either stainless or chrome steel. Alternatively, the hinge 46 may utilize a loose fitting pin (not shown) having a lower threaded section and a knurled knob on the upper end of the pin for adjusting the clamping tension imposed on first and second tubular elements 46a, 46b to retain the second main panel 24 in a desired stationary position relative to the first main panel 22.

In view of the above-described construction of the supplemental visor assembly 20 and its securement to the existing sun visor panel 42, the assembly 20 is thereby foldable to a compact state such that the first and second main panels 22, 24 and retracted first and second extension panels 26, 28 rest substantially flat together against the existing sun visor panel 42, as seen in FIGS. 1-3. The supplemental visor assembly 20 rests above and parallel to a rear surface 42a of the sun visor panel 24 when the sun visor panel 42 is in a raised stored position, as seen in FIG. 2. When the sun visor panel 42 is pivoted downwardly to a lowered shading position, the supplemental visor assembly 20 continues to rest substantially flat against the rear surface 42a of the sun visor panel 42 in a downwardly and parallel extending position, as seen in FIG. 3.

Referring again to FIGS. 4A, 4B and 5, fuller shading coverage of the supplemental visor assembly 20 is gained by pivoting the second main panel 24 away from the first main panel 22 at a desired angle, typically between approximately 90° to 110°, as seen in FIG. 4A. A driver or front-seat passenger is thereby shaded from sun glare by both the first and second main panels 22, 24 of the assembly 20. If still further shading is needed, the first and second extension panels 26, 28 can be individually slid laterally by finger pressure on tab portions 26g, 28g of the first and second extension panels 26, 28. The first and second extension panels 26, 28 are thereby laterally movable until tab portions 26g, 28g make contact with their respective nearest adjacent mounting members 30 and 34, as seen in FIGS. 4B and 5. Further outward movement of the first and second extension panel 26, 28 is thereby halted when such contact is made.

The first and second extension panels 26, 28 may be moved to lengths different from one another, depending on the amount of shading coverage needed at the particular window area. For example, the second extension panel 28 may be laterally moved until contact is made by tab portion 28g with the inner mounting member 34 for greater shading at a side window of the driver or front-seat passenger. At the same time, the first extension panel 26 may be laterally moved a lesser distance such that contact between the tab portion 26g and mounting member 30 is not attained if a lesser shading length is needed frontally by the driver or front-seat passenger.

Referring particularly to FIG. 6, a further alternative embodiment of the supplemental visor assembly 20 includes a joint 50 having a ball 52 and a socket 54. The ball 52 is rigidly attached to an upper end of the pin 48 of the hinge 46. The socket 54 is attached to a support structure 56 in the vehicle other than the existing sun visor panel 42. This alternative type of supporting arrangement permits the supplemental visor assembly 20 free pivotal movement in any direction, completely apart from the sun visor panel 42. The supplemental visor assembly 20 can thereby be utilized as an entity entirely separate from the sun vison panel 42, as varying shading needs may dictate.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A supplemental visor assembly, comprising:
   (a) a first main panel having a pair of opposite lateral ends;
   (b) a first extension panel placeable against said first main panel;
   (c) first means for mounting said first extension panel on said first main panel to undergo laterally slideable movement between retracted and extended positions relative to said first main panel and past one of said pair opposite lateral ends thereof;
   (d) a second main panel having a pair of opposite lateral ends, said second main panel being mounted at one of said pair of opposite lateral ends thereof to the other of said pair of opposite lateral ends of said first main panel to undergo pivotal movement between a stored position against said first main panel and said first extension panel and a deployed position away therefrom;
   (e) a second extension panel placeable against said second main panel; and
   (f) second means for mounting said second extension panel on said second main panel to undergo laterally slideable movement movement between retracted and extended positions relative to said second main panel and past the other of said pair of opposite lateral ends thereof.

2. The assembly of claim 1 wherein each of said first and second main panels has a generally rectangular flat configuration.

3. The assembly of claim 1 wherein each of said first and second extension panels has a generally rectangular flat configuration.

4. The assembly of claim 3 wherein each of said first and second extension panels has a smaller size than that of each of said first and second main panels.

5. The assembly of claim 1 wherein each of said first and second extension panels has a tab portion extending along and merging from one of a pair of opposite end edges of each of said first and second extension panels for use in initiating and halting lateral slideable movement of said first and second extension panels.

6. A supplemental visor assembly, comprising:
(a) a first main panel;
(b) a first extension panel placeable against said first main panel;
(c) first means for mounting said first extension panel on said first main panel to undergo laterally slideable movement relative thereto;
(d) a second main panel mounted to one end of said first main panel to undergo pivotal movement between a stored position against said first main panel and said first extension panel and a deployed position away therefrom;
(e) a second extension panel placeable against said second main panel; and
(f) second means for mounting said second extension panel on said second main panel to undergo laterally slideable movement relative thereto;
(g) said first and second mounting means including first and second pairs of spaced mounting members, each of said mounting members being a narrow strap extending across a side of a respective one of said first and second main panels and having opposite ends merging from said respective main panel.

7. The assembly of claim 6 wherein said first and second main panels and first and second pairs of mounting members are made of a material being resistant to ultraviolet light penetration.

8. The assembly of claim 1 further comprising:
a hinge connecting said first and second main panels together.

9. The assembly of claim 8 wherein said hinge includes a plurality of first and second tubular elements having passages therethrough, said first and second tubular elements being respectively attached on adjacent end edges of said first and second main panels, said first tubular elements being offset from said second tubular elements as to permit interfitting of said first and second tubular elements together in a manner which aligns said passages through said first and second tubular elements with one another.

10. The assembly of claim 9 wherein said hinge also includes an elongated pin being insertable through said aligned passages of first and second tubular elements.

11. A supplemental visor assembly, comprising:
(a) a first main panel;
(b) a first extension panel placeable against said first main panel;
(c) first means for mounting said first extension panel on said first main panel to undergo laterally slideable movement relative thereto;
(d) a second main panel;
(e) a hinge connecting one end of said second main panel to one end of said first main panel such that said second main panel can undergo pivotal movement between a stored position against said first main panel and said first extension panel and a deployed position away therefrom;
(f) a second extension panel placeable against said second main panel;
(g) second means for mounting said second extension panel on said second main panel to undergo laterally slideable movement relative thereto;
(h) said hinge also including a joint attachable to a support structure to support said first and second main panels from said support structure.

12. The assembly of claim 11 wherein said joint has a ball and a socket, said ball being attached to said hinge, said socket being pivotally mated with said ball and attachable to a support structure.

13. A supplemental visor assembly, comprising:
(a) a first main panel placeable against an existing sun visor panel;
(b) means for securing said first main panel to the existing sun visor panel;
(c) first extension panel placeable against said first main panel;
(d) first means for mounting said first extension panel on said first main panel to undergo laterally slideable movement relative thereto;
(e) a second main panel hingedly mounted at one lateral end to one lateral end of said first main panel to undergo pivotal movement between a stored position against said first main panel and said first extension panel and a deployed position away therefrom for shielding a portion of a vehicle side window;
(f) a second extension panel placeable against said second main panel; and
(g) second means for mounting said second extension panel on said second main panel to undergo laterally slideable movement relative thereto.

14. The assembly of claim 13 wherein said securing means is a pair of resiliently flexible tension clips spaced from one another and attached to said first main panel, said tension clips being attachable to the existing sun visor panel to releasably secure said first main panel to the existing sun visor panel.

15. The assembly of claim 13 wherein said securing means is a pair of elastic bands spaced from one another and releasably encircling said first main panel, said bands being disposable around the existing sun visor panel to releasably secure said first main panel to the existing sun visor panel.

16. The assembly of claim 13 wherein each of said first and second main panels has a generally rectangular flat configuration and a larger size than that of the existing sun visor panel.

17. The assembly of claim 13 wherein each of said first and second extension panels has a generally rectangular flat configuration and a smaller size than that of said first and second main panels.

18. The assembly of claim 17 wherein said first extension panel has a lower corner cutout so as to permit fitting of said first extension panel around a rear view mirror disposed adjacent to the existing sun visor panel.

19. The assembly of claim 13 wherein each of said first and second extension panels has a tab portion extending along and merging from one of a pair of opposite end edges of each of said first and second extension panels for use in initiating and halting lateral slideable movement of said first and second extension panels.

20. The assembly of claim 13 wherein said first and second mounting means includes first and second pairs of spaced mounting members, each of said mounting members being a narrow strap extending across a side of a respective one of said first and second main panels and having opposite ends merging from said respective main panel.

21. The assembly of claim 20 wherein said first and second main panels and first and second pairs of mounting members are made of a material being resistant to ultraviolet light penetration.

22. The assembly of claim 13 further comprising:
a hinge connecting said first and second main panels together.

23. The assembly of claim 22 wherein said hinge includes a plurality of first and second tubular elements having passages therethrough, said first and second tubular elements being respectively attached on adjacent end edges of said first and second main panels, said first tubular elements being offset from said second tubular elements as to permit interfitting of said first and second tubular elements together in a manner which aligns said passages through said first and second tubular elements with one another.

24. The assembly of claim 23 wherein said hinge also includes an elongated pin being insertable through said aligned passages of first and second tubular elements.

* * * * *